United States Patent [19]

Alm et al.

[11] Patent Number: 4,968,052
[45] Date of Patent: Nov. 6, 1990

[54] WHEEL LIFT APPARATUS

[76] Inventors: Bernard D. Alm, 225 Carlton Road, Unionville, Ontario, Canada, L3R 3M3; Leslie Bubik, 421 Roselawn Ave., Toronto, Ontario, Canada, M5N 1J9; Kenichi K. Muramatsu, 22 Lucerne Ct., Scarborough, Ontario, Canada, M1G 127

[21] Appl. No.: 438,705

[22] Filed: Nov. 17, 1989

[51] Int. Cl.⁵ .............................................. B60P 3/12
[52] U.S. Cl. .................................... 280/402; 414/563
[58] Field of Search ......................... 280/402; 414/563

[56] References Cited

U.S. PATENT DOCUMENTS

| | | | |
|---|---|---|---|
| 2,541,582 | 2/1951 | Hawkins | 280/402 |
| 3,182,829 | 5/1965 | Wagner | 280/402 |
| 3,690,482 | 9/1972 | Gaumont | 280/402 |
| 3,700,125 | 10/1972 | Aquila | 280/402 |
| 3,897,879 | 8/1975 | Bubik | 280/402 |
| 4,034,873 | 7/1977 | Haring | 280/402 |
| 4,383,807 | 5/1983 | Bubik | 414/563 |
| 4,384,817 | 5/1983 | Peterson | 280/402 |
| 4,473,334 | 9/1984 | Brown | 280/402 |
| 4,557,496 | 12/1985 | Sill | 280/402 |
| 4,573,857 | 3/1986 | Porter, Sr. et al. | 414/563 |
| 4,632,629 | 12/1986 | Kooima | 280/402 |
| 4,679,978 | 7/1987 | Holmes | 280/402 |
| 4,793,763 | 12/1988 | Bubik | 414/563 |
| 4,795,303 | 12/1989 | Bubik | 414/563 |
| 4,798,509 | 1/1989 | Bubik | 280/402 |
| 4,840,534 | 6/1989 | Totty | 280/402 X |
| 4,874,285 | 10/1989 | Bubik | 280/402 |

FOREIGN PATENT DOCUMENTS 895691 6/1962 United Kingdom .

Primary Examiner—Charles A. Marmor
Assistant Examiner—Mitchell Bompey
Attorney, Agent, or Firm—Niro, Scavone, Haller & Niro, Ltd.

[57] ABSTRACT

A wheel lift towing apparatus includes a crossbar with opposing end portions; two collars, one being mounted to each crossbar end portion; two wheel retainer locating struts, one being connected to each crossbar end portion via one of the collars; and two wheel retainers, one being mounted to a free end of each of the locating struts. The wheel retainers each have a central arm with first and second wheel engaging elements disposed at the opposing ends of the central arm. The wheel retainer support structure associated with each strut is configured to position each wheel retainer so that the retainers' respective first wheel engaging elements are located below a center axis of the wheels of the vehicle to be towed and so that the retainers' respective second wheel engaging elements are located above the center axis of the wheels of the vehicle.

5 Claims, 2 Drawing Sheets

WHEEL LIFT APPARATUS

BACKGROUND OF THE INVENTION

The present invention is directed to a novel apparatus used for lifting and towing a vehicle More particularly, the present invention is directed to a wheel lift towing apparatus, for use with wreckers and recovery vehicles, in which a uniquely designed wheel retainer and mounting assembly is employed to significantly enhance the facility, versatility and safety of the device.

Wheel lift towing apparatus are now well known in the wrecker and recovery industry. Such wheel lift apparatus have become increasingly popular in recent years by virtue of the fact that they permit a vehicle to be engaged via its wheels and thereby reduce the possibility of damage to the vehicle during the towing operation. Examples of prior art wheel lift towing apparatus are disclosed in U.S. Pat. Nos. 4,384,817; 4,473,334; 4,557,496; 4,679,978; and 4,836,737.

While such prior art wheel lift towing apparatus have met with a measure of success, they nevertheless suffer from a variety of disadvantages which limit their acceptance in the trade. For example, all of these prior art devices require the use of tie down straps to secure the vehicle to the wheel lift. However, tie down straps make the so-called "hook up" of the disabled vehicle more time consuming and difficult, particularly in inclement weather. Moreover, tie down straps may be improperly assembled to the wheel lift and vehicle during the towing operation, creating the risk that the vehicle may inadvertently separate or dislodge from the wheel lift. Furthermore, a careless operator may simply neglect to use the tie down strap which likewise creates a potentially dangerous condition.

Another disadvantage associated with most prior art wheel lift devices is their use of wheel retaining structures which are generally large, cumbersome and heavy. These wheel retaining structures, because of their size, shape and weight are more difficult to handle, assemble and store. Moreover, these prior art wheel lifts position the wheel retaining structures in a generally horizontal orientation during the towing operation and locate the retaining structures at or near the lowermost portion of the wheel. This positioning and location of the retaining structures result in more difficult assembly and restriction in the use of the wheel lift, particularly when obstructions or other unusual circumstances exist in the towing operation.

SUMMARY OF THE INVENTION

The present invention is directed to a wheel lift towing apparatus which overcomes many of the disadvantages of prior art devices. For example, the wheel lift apparatus of the present invention does not require tie down straps while still positively securing the disabled vehicle in the wheel lift to thereby foreclose any possibility of inadvertent separation. In addition, the present invention makes use of a uniquely designed wheel retainer which is positioned relative to the wheels of the disabled vehicle to significantly enhance the versatility, facility and safety of the wheel lift apparatus.

It is therefore an object of the present invention to provide a new and unique wheel lift towing apparatus.

It is a further object of the invention to provide a strapless wheel lift towing apparatus which prevents inadvertent vehicle separation from the wheel lift.

Another object of the present invention is to provide a wheel lift towing apparatus which makes use of a new and more convenient wheel retainer locating means and releaseably mounted uniquely designed wheel retainers.

It is still a further object of the present invention to provide a wheel lift towing device having a wheel retainer with wheel engaging elements located both below and above the wheels of the disabled vehicle.

A further object of the present invention is to provide a wheel lift towing apparatus which employs relatively lightweight and manageable wheel retainers which are easily assembled to their supporting structures and sized for convenient storage when not in use.

According to the present invention, an apparatus is provided for lifting and towing a vehicle wherein the apparatus includes a crossbar with opposing end portions, a pair of wheel retainer locating struts connected to the end portions of the crossbar, wheel retainer supports located at the rear free ends of the locating struts, and a pair of wheel retainers each having a central arm with first and second wheel engaging elements at opposite ends. The wheel retainer supports are configured to position the wheel retainer at an angle relative to horizontal so that the first wheel engaging elements are located below the disabled vehicle's wheels and the second wheel engaging elements are located above the vehicle's wheels.

BRIEF DESCRIPTION OF THE DRAWINGS

The novel features of the invention are set forth in the appended claims. The invention and its preferred embodiments, however, together with further objects and attendant advantages, will be best understood by reference to the following description taken in connection with the accompanying drawings in which:

DETAILED DESCRIPTION OF THE INVENTION

Figure 1:
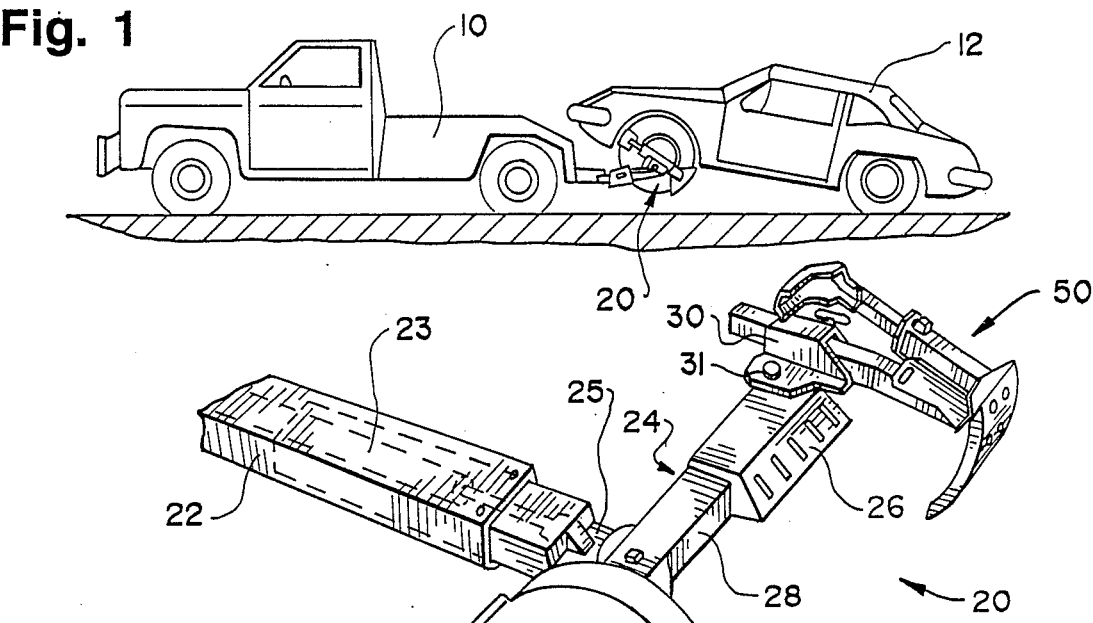
FIG. 1 is a side view showing the present invention assembled to a wrecker and towing an automobile.

With reference to FIG. 1, a preferred embodiment of the present invention is illustrated in a typical application wherein a wrecker or recovery vehicle 10 is used to lift and tow another vehicle 12. As with prior art wheel lift devices, the apparatus of the present invention, designated generally in FIG. 1 as 20, is assembled onto the rear of the wrecker and is positionable below vehicle 12 to permit engagement of the apparatus with the wheels of vehicle 12. In this way substantially all of the vehicle's weight is transmitted to the wheel lift apparatus 20 through the vehicle's wheels to thereby prevent damage to other more fragile vehicle.

Figure 2:
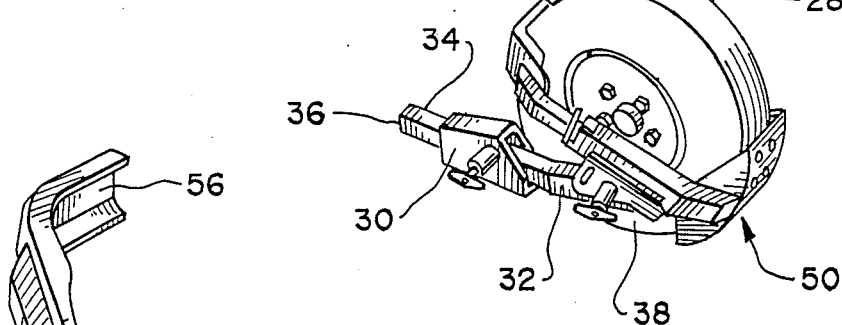
FIG. 2 is a perspective view of a preferred embodiment of the present invention and shown supporting one wheel (of a towed vehicle, not illustrated)
Figure 3:
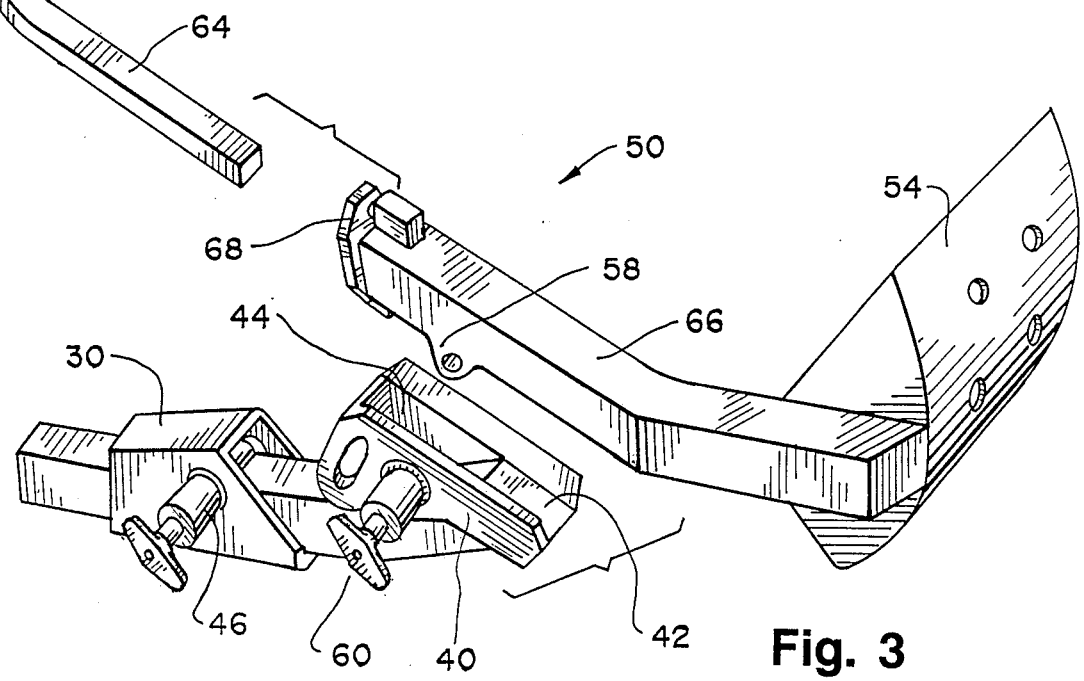
FIG. 3 is an exploded perspective view of portions of the preferred embodiment of the invention, showing details of the relationship between the wheel retainer, retainer locating strut and collar.
Figure 4:
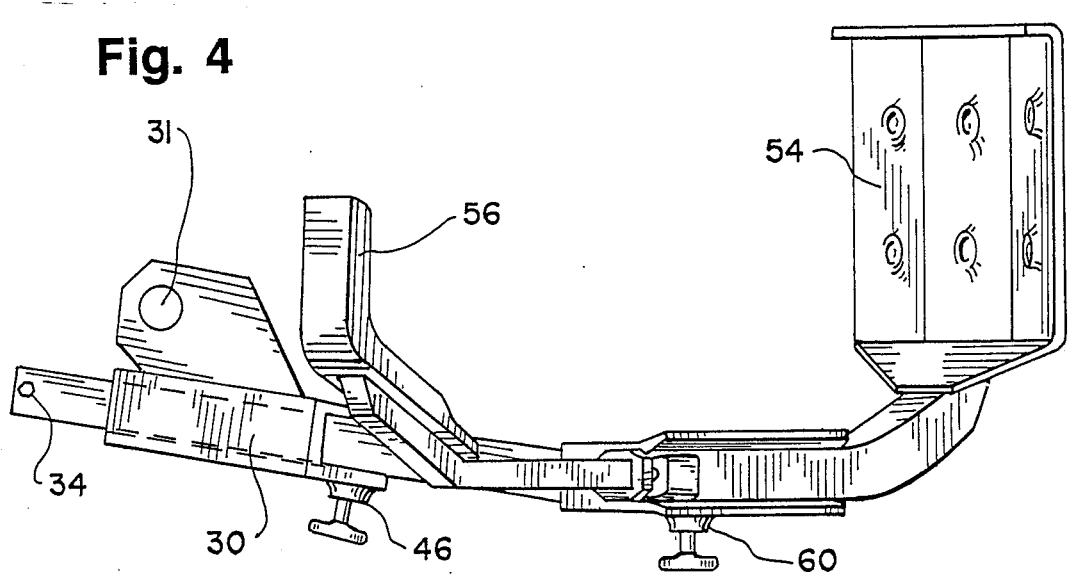
FIG. 4 is a plan view of the novel retainer structure of the present invention as assembled to other portions of the preferred embodiment.
Figure 5:
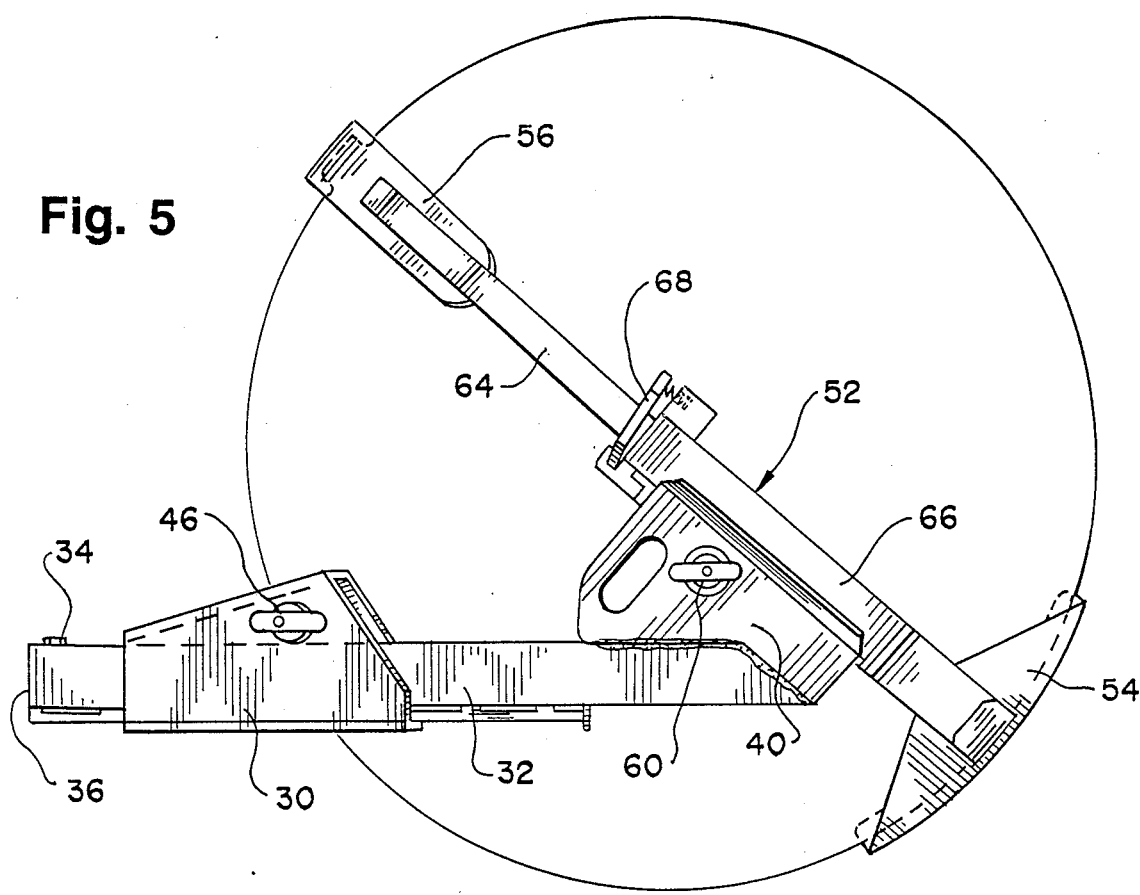
FIG. 5 is a side view illustrating the position and location of the novel wheel retainer structure of the present invention relative to one of the wheels of the towed vehicle.

A preferred embodiment of the present invention is illustrated with greater detail in FIGS. 2–5. In the following description, directional terms such as "front", "forward", "back" or "rearward" are made with reference to the recovery vehicle. For example, "forward" portions of the wheel lift are those positioned closest to the recovery vehicle. As shown in FIG. 2, the wheel lift apparatus 20 includes a boom 22 having a crossbar 24 pivotally connected at its rear end 25. The boom is both extendable and retractable by virtue of its telescopic construction and the use of powered actuators, such as hydraulic cylinder 23. The boom 22 may also be moved vertically and tilted to facilitate location of the wheel lift under the vehicle to be towed. The crossbar 24 has end portions 26 (only one is shown in FIG. 2) which are telescopically mounted over the crossbar's center portion 28.

Two collars 30 are disposed on the crossbar end portions. In preferred form, collars 30 are pivotally disposed about a vertical axis or pin 31 and are configured with a vertical dimension which increases from front to back. The design and construction of collars 30 are similar to the disclosure of U.S. Pat. No. 4,637,623 which is incorporated herein by reference. The function and operation of collars 30 will be discussed below.

A pair of wheel retainer locating struts 32 are connected to the end portions 26 of crossbar 24 via collars 30. The locating struts 32 are movable in different directions. First, the struts may move forward and rearward relative to collars 30 and crossbar 24. Second, the struts may be raised vertically within collars 32. Third, the struts may be moved horizontally from a remote location laterally outside the vehicle to be towed to a vehicle lifting position immediately adjacent the wheels of the vehicle.

Each locating strut 32 is retained within its respective collar by a stop such as bolt 34 located at the strut's forward end 36. The free end or rear end 38 of each strut 32 includes a wheel retainer support 40 which, in the illustrated embodiment, comprises a saddle or bracket 42 having a recess 44. Once properly located relative to collars 32 and crossbar 24, the locating struts may be locked in position by any conventional means, such as the releasable locking pin 46 used in conjunction with cooperating collar pins and strut holes (not shown, but illustrated in the incorporated disclosure of U.S. Pat. No. 4,637,623).

A pair of uniquely designed wheel retainers 50 are employed in the wheel lift apparatus of the present invention. Each wheel retainer includes an elongated central arm 52 having a first wheel engaging element 54 at one end and a second wheel engaging element 56 at its other end. The central arm 52 is configured to be mounted within bracket 42 and includes a transverse protuberance 58 which is sized to fit or nest within recess 44. Once the retainer is properly assembled to support 40, the releasable locking device 60 may be actuated to secure the wheel retainers in their assembled position.

In the illustrated preferred embodiment, the wheel retainer 50 employs an extendable and retractable central arm 52. Thus, the arm 52 is comprised of telescoping inner and outer parts, 64 and 66 respectively, which are held at any specific longitudinal position by a locking means, such as friction lock 68. In this way, the spacing between first wheel engaging element 54 and second wheel engaging element 56 may be adjusted to accommodate different wheel sizes.

The use and operation of the wheel lift apparatus of the present invention will be apparent to those of ordinary skill in the art from the foregoing description. Generally, the steps or operations during a typical hook-up are conducted as follows. First, the locating struts 32 which may be positioned longitudinally along the top of crossbar 24 when not in use, are rotated horizontally about collar pin 31 to a remote position laterally outside the vehicle to be towed. Next, the crossbar is positioned below the vehicle and adjacent to its wheels to be engaged. The strut 32 may then be positioned relative to crossbar 24 to accommodate the particular wheel size of the vehicle to be towed, and the wheel retainers 50 are then assembled onto the supports 40. Each of the assembled wheel retainers and struts are then rotated horizontally into a wheel lifting position with the struts 32 located immediately adjacent the vehicle's wheels. Accordingly, the first wheel engaging elements 54 are located along and juxtaposed with the lower rear quadrants of the wheels, and the second wheel engaging elements are located along and juxtaposed with the upper forward quadrants of the wheels.

Those of skill in the art will appreciate that, when assembled to the vehicle in this manner, the wheel lift apparatus of the present invention provides a positive, mechanical securing system which virtually eliminates the possibility of inadvertent separation of the vehicle from the wheel lift. Moreover, the apparatus is easy to use and preserves all of the advantages associated with the prior art wheel lift device disclosed in U.S. Pat. No. 4,637,623. In addition, the wheel retainers 50 are relatively light weight and easily handled by the towing operator. They are also relatively small and may be conveniently stored on the recovery vehicle.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

We claim:

1. An apparatus for use in lifting and towing a vehicle having a pair of opposed wheels, said apparatus comprising:

a crossbar positionable below said vehicle, said crossbar having opposing end portions;

a pair of wheel retainer locating struts, each being connected to one of said crossbar end portions and including a rearwardly extending free end having a wheel retainer support bracket;

a pair of wheel retainers, each said wheel retainer being releasably mounted to one of said support brackets and having a central arm with first and second wheel engaging elements disposed at the ends of said arm; and said wheel retainer support brackets being adapted to position said wheel retainers such that the first wheel engaging elements of said wheel retainers are located below a center axis of said wheels and the second wheel engaging elements of said wheel retainers are located above the center axis of said wheels, to thereby mechanically secure the vehicle to said apparatus.

2. The vehicle lifting and towing apparatus of claim 1 wherein the first wheel engaging elements are located adjacent the lower rear quadrant of said wheels and the second wheel engaging elements are located adjacent the upper forward quadrant of said wheels.

3. The vehicle lifting and towing apparatus of claim 1 further comprising a pair of collars, said collars being mounted to said crossbar end portions and adapted to connect said locating struts with said crossbar and permit horizontal movement of said locating struts from a remote position laterally outside said vehicle to a vehicle lifting position immediately adjacent the wheels of said vehicle.

4. The vehicle lifting and towing apparatus of claim 1 wherein the arm of each said wheel retainer is extendable and retractable to permit adjustment of the spacing between said first and second wheel engaging elements.

5. The vehicle lifting and towing apparatus of claim 1 further comprising means for locking each of said wheel retainers in mounted relation to its respective wheel retainer support bracket.

* * * * *